United States Patent
Hinotani et al.

(10) Patent No.: US 8,296,790 B2
(45) Date of Patent: Oct. 23, 2012

(54) PROTECTIVE COVER FOR DISK-SHAPED RECORDING MEDIUM

(75) Inventors: Kei Hinotani, Tokyo (JP); Shuji Suzuki, Saitama (JP)

(73) Assignee: Plastic Arts Co., Ltd., Tokyo (JP)

( * ) Notice: Subject to any disclaimer, the term of this patent is extended or adjusted under 35 U.S.C. 154(b) by 144 days.

(21) Appl. No.: 12/866,572

(22) PCT Filed: Aug. 25, 2008

(86) PCT No.: PCT/JP2008/065079
§ 371 (c)(1),
(2), (4) Date: Nov. 30, 2010

(87) PCT Pub. No.: WO2009/098794
PCT Pub. Date: Aug. 13, 2009

(65) Prior Publication Data
US 2011/0078713 A1    Mar. 31, 2011

(30) Foreign Application Priority Data

Feb. 8, 2008   (JP) .............................. 2008-000645 U

(51) Int. Cl.
*G11B 7/24*   (2006.01)
*G11B 23/03*  (2006.01)

(52) U.S. Cl. ...................................... 720/719
(58) Field of Classification Search .................. 720/718, 720/719, 720, 725
See application file for complete search history.

(56) References Cited

U.S. PATENT DOCUMENTS

| | | | | |
|---|---|---|---|---|
| 5,299,186 | A * | 3/1994 | Tsurushima | 206/308.1 |
| 6,771,588 | B2 * | 8/2004 | Poole et al. | 369/291.1 |
| 6,901,600 | B2 * | 5/2005 | Liu | 720/719 |
| 7,043,742 | B1 * | 5/2006 | Liu | 720/719 |
| 7,389,871 | B2 * | 6/2008 | Crouan | 206/310 |
| 2005/0149962 | A1 * | 7/2005 | Poole et al. | 720/725 |
| 2005/0160442 | A1 * | 7/2005 | Kaplowitz | 720/719 |
| 2006/0184958 | A1 * | 8/2006 | Garcia | 720/719 |

FOREIGN PATENT DOCUMENTS

| | | |
|---|---|---|
| JP | 61-064678 U | 5/1986 |
| JP | 11-33478 A | 12/1999 |
| JP | 2002-264985 A | 9/2002 |
| JP | 2002-334554 A | 11/2002 |
| JP | 3100211 U | 12/2003 |
| JP | 2004-182315 A | 7/2004 |
| JP | 2005-096813 A | 4/2005 |
| JP | 2005-251327 A | 9/2005 |
| JP | 2006-347631 A | 12/2006 |

* cited by examiner

*Primary Examiner* — Angel A. Castro
(74) *Attorney, Agent, or Firm* — Rabin & Berdo, P.C.

(57) ABSTRACT

A protective cover for covering the recording surface of a disk-like recording medium so that the recording surface does not come into contact with other objects. The disk-like recording medium can be easily attached to and detached from the protective cover. The protective cover (2), made of resin, covers the recording surface of the recording medium (1) to protect the recording surface. The diameter of the protective cover (2) is set smaller than that of the recording medium (1), an outer peripheral part (11) of the protective cover (2) comes into contact with a margin portion on the outer peripheral side of a recording area of the recording surface of the recording medium (1), and, in the area between the outer peripheral part (11) and an inner peripheral contact part (12) coming into contact with margin portion, a cover body (10) of the protective cover is separated from the recording surface of the recording medium (1).

8 Claims, 7 Drawing Sheets

PROTECTIVE COVER FOR DISK-SHAPED RECORDING MEDIUM

FIELD OF THE INVENTION

The present invention relates to a protective cover for a disk-shaped recording medium to protect a recording portion of the disk-shaped recording medium such as a compact disk (CD) and a digital versatile disk (DVD). More particularly, the present invention relates to a protective cover for the disk-shaped recording medium to protect one surface of the disk.

DESCRIPTION OF RELATED ART

A disk-shaped recording medium, such as a CD including music data and other data recorded therein and a DVD including various information such as an images and a game recorded therein, may not be played in a case where a data recorded surface thereof is damaged. Conventionally, for example, a plastic case having a body and an openable lid, a paper case, or a film case has been generally used to protect the data recorded surface at the time of carrying or storing the disk-shaped recording medium.

The disk-shaped recording medium includes main surfaces. One of the main surfaces serves as a recording surface or a reading surface, and is generally provided on a back side of the other main surface on which a print is provided. Some of the related-art covers are structured to cover one of the main surfaces of the recording medium, and each of some of the related-art covers serves as a related-art protective cover for the disk-shaped recording medium. For example, Patent Document 1 discloses the related-art cover including a base made of a flexible material. Herein, the base has a diameter that is larger than that of the disk-shaped recording medium. Patent Document 2 discloses another related-art cover including a print provided on one portion of a base protecting a disk-shaped reading surface. Herein, the print is provided on one portion of the base to complement a print portion missing from the disk-shaped recording medium. Moreover, Patent Document 3 discloses another related-art cover, serving as the protective cover for the disk-shaped recording medium, by disposing a holding tab in an outer circumference portion of a circular-shaped body thereof.

Patent Document 1: Japanese Unexamined Patent Application Publication No. 2002-264985
Patent Document 2: Japanese Unexamined Patent Application Publication No. 2002-334554
Patent Document 3: Japanese Unexamined Patent Application Publication No. 2005-96813

SUMMARY OF THE INVENTION

The disk-shaped recording medium, however, may not be solely removed easily where the disk-shaped recording medium is attached to each of the above protective covers. That is, use of such a protective cover covering only the recording side of the disk-shaped recording medium allows to store the recording media in utilizing the printing surface and to realize reduction of occupied space in comparison with a situation for storage in use of plastic cases having the body and the openable lid. With the arts described above patent documents, however, the member such as a substrate serving as the protective cover in holding the disk-shaped recording medium is inevitably manipulated, or a piece member or like arranged at the center hole or the outer circumference of the disk-shaped recording medium is inevitably manipulated, so that the disk-shaped recording medium is required to be removed while its piece member is manipulated, and so that such manipulation may become laborious where the protective cover is tried to be removed.

It is therefore an object to provide a protective cover covering a recording side of a disk-shaped recording medium without contacting to the recording surface thereof, thereby allowing users to easily handle the protective cover at a time such that the disk-shaped recording medium is attached and detached.

To solve the above technical problems, the protective cover for disk-shaped recording medium according to the invention is a resin made protective cover for protecting the recording surface of the disk-shaped recording medium by covering the recording surface of the disk-shaped recording medium. The diameter of the protective cover is smaller than the diameter of the disk-shaped recording medium; an outer circumference portion of the protective cover comes in contact with a margin portion on an outer circumference side of a recording area on the recording surface of the disk-shaped recording medium; a cover body of the protective cover is kept away from the recording surface of the disk-shaped recording medium between the outer circumference and an inner circumference contacting portion in contact with the margin portion on an inner circumference side of the recording area on the recording surface of the disk-shaped recording medium.

In accordance with a preferred embodiment, the protective cover is arranged with an annular projecting portion fitting to the center hole of the disk-shaped recording medium from the hole's inner side, and the protective cover can be formed to have a convex portion at a center of the annular projecting portion. A concave portion may be formed at an area on a back side of the protective cover corresponding to the annular projecting portion for fitting an end of the annular projecting portion of another protective cover where another protective cover is stacked on the protective cover. An inclined surface for preventing stacked media from sliding laterally can be arranged at the concave portion for fitting the end of the annular projecting portion of another protective cover.

The protective cover of the disk-shaped recording medium according to the invention may be formed with a cutoff portion at a part of the annular projecting portion, and can be arranged to have a clip or clips engaging an edge of the center hole so that the center hole of the disk-shaped recording medium is pushed radially outward. The outer circumference portion can be shaped in rising from the cover body and having a thickness thinner as going remoter from the center, thereby rendering the end of the outer circumference portion pushed toward the disk-shaped recording medium by resilient force from elastic transformation of the protective cover when the protective cover is attached to the disk-shaped recording medium.

According to the protective cover for disk-shaped recording medium of the invention, the diameter of the protective cover is made smaller than the diameter of the disk-shaped recording medium, so that where the disk-shaped recording medium attaching the protective cover is held by one hand, the fingers come in contact with the outer circumference portion of the disk-shaped recording medium, thereby allowing the user to hold the disk-shaped recording medium without touching the protective cover directly. By pushing the convex portion formed at a center of the protective cover with the index finger while the outer circumference portion of the disk-shaped recording medium is held with the thumb, the ring finger, and the little finger, the protective cover can be separated from the disk-shaped recording medium by one hand, so that handling the disk-shaped recording medium becomes quite easy when such a disk-shaped recording medium is attached and detached.

DETAILED DESCRIPTION OF THE INVENTION

In reference with the drawings, protective covers for disk-shaped recording medium according to preferred embodiments of the invention will be described.

First Embodiment

Figure 1:
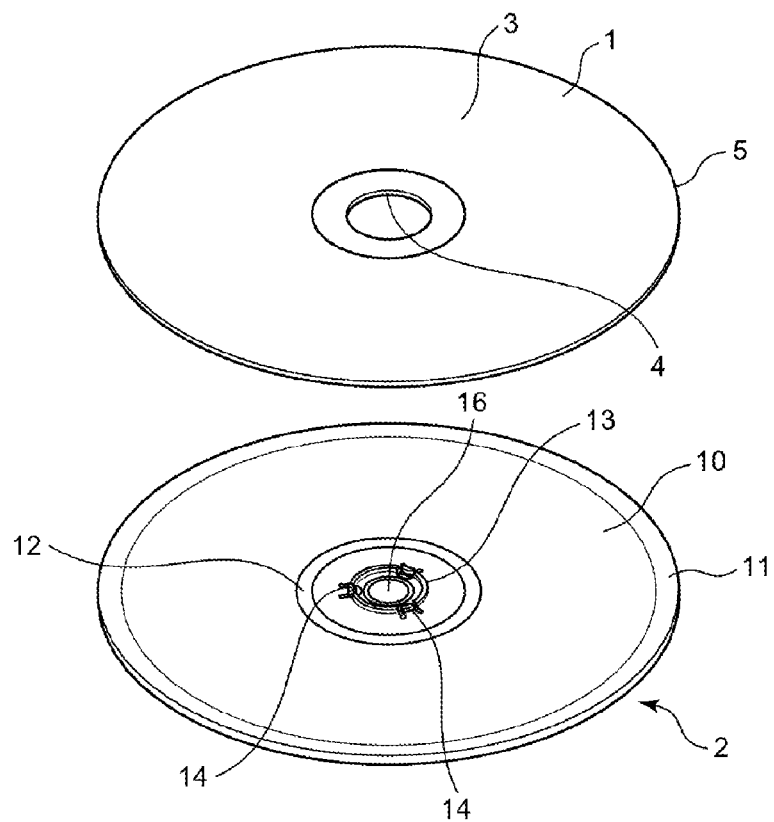
FIG. 1 is a perspective view showing an embodiment of a protective cover for disk-shaped recording medium according to the invention and illustrating a state in which the disk-shaped recording medium and the protective cover are separated from each other.
Figure 2:
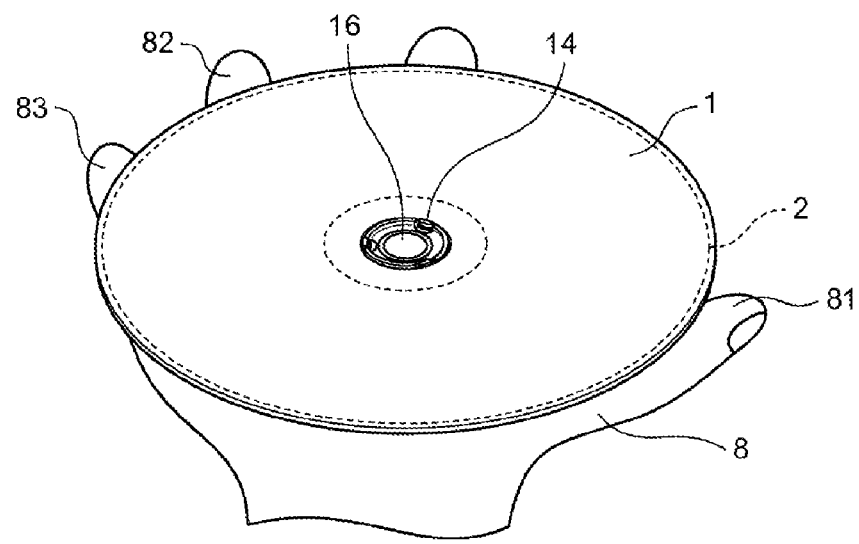
FIG. 2 is a perspective view showing the embodiment of the protective cover for disk-shaped recording medium according to the invention and illustrating a state in which the disk-shaped recording medium is attached and held to the protective cover.
Figure 3:
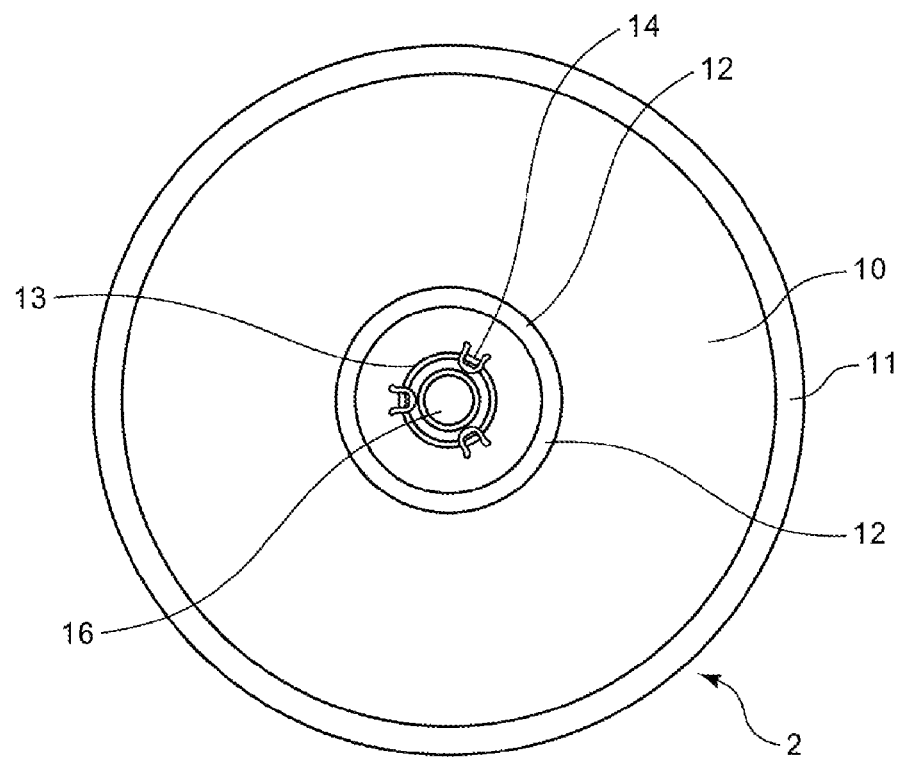
FIG. 3 is a top view showing the embodiment of the protective cover for disk-shaped recording medium according to the invention.
Figure 4:
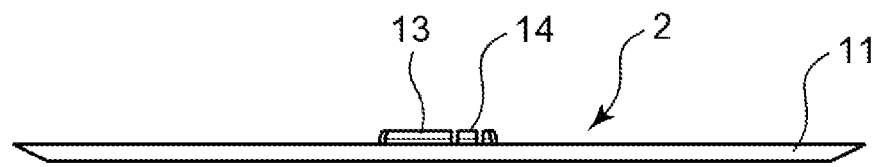
FIG. 4 is a side view showing the embodiment of the protective cover for disk-shaped recording medium according to the invention.

As shown from FIG. 1 to FIG. 4, a protective cover 2 for disk-shaped recording medium according to this embodiment is an example used for protection of a recording surface of a disk 1 having a diameter of 120 millimeters such as CD and DVD serving as a disk-shaped recording medium. Various sizes of the disk-shaped recording media have been known, and the protective cover 2 for disk-shaped recording medium according to the invention can be arranged in a disk shape in accordance with the size of the disk-shaped recording medium. For a small size disk, the protective cover itself is therefore made in a small size. In this embodiment, the diameter of the protective cover 2 corresponds to the disk 1, and is made a little smaller than that of the disk 1, e.g., having a diameter of 118 millimeters. Accordingly, where the protective cover 2 is attached to the disk 1 as fitting the center of the disk 1 into the center of the protective cover 2, the protective cover 2 is so attached as to render the disk 1 showing radially outside of the protective cover 2 over the entire circumference by one millimeter width as shown in FIG. 2.

The disk 1 has one side as the recording surface and a hole 4 of 15 millimeters in diameter at the center thereof. A printed surface 3 is formed at the major surface opposite to the recording surface of the disk 1. The recording area in the recording surface of the disk 1 is formed in a range from the inner diameter of 50 millimeters to the outer diameter of 116 millimeters, and an area of a width of 17.5 millimeters in a radial direction outside the hole 4 of the disk 1 is an inner circumferential margin portion serving as a margin area, whereas an area of a width of 2 millimeters in the radial direction from the outmost circumferential portion 5 of the disk 1 is a an outer circumferential margin portion serving as a margin area. No recording area of the disk 1 therefore receives damages even where the protective cover 2 is arranged in contacting to each of those margin portions, so that the signals can be read out surely.

The protective cover 2 is made of relatively widely used, inexpensive plastic resins such as, e.g., polyethylene, polypropylene, and polystyrene, as a main component, which can be produced in a large volume in use of plastic molding arts such as injection molding. The protective cover 2 is chiefly formed of a disk-shaped cover body 10, and includes an outer circumference portion 11 shaped in obliquely rising, an inner circumferential contacting portion 12 contacting to an inner circumferential side of the recording surface of the disk 1, an annular projecting portion 13 having three clips 14, and a convex portion 15 pressed by a finger or the like. The cover 2 further includes a concave portion 18 formed on a back side for stacking. Those of the cover body 10, the outer circumference portion 11, the inner circumferential contacting portion 12, the annular projecting portion 13, the clips 14, and the convex portion 15 are formed in a united body with a resin.

Figure 5:
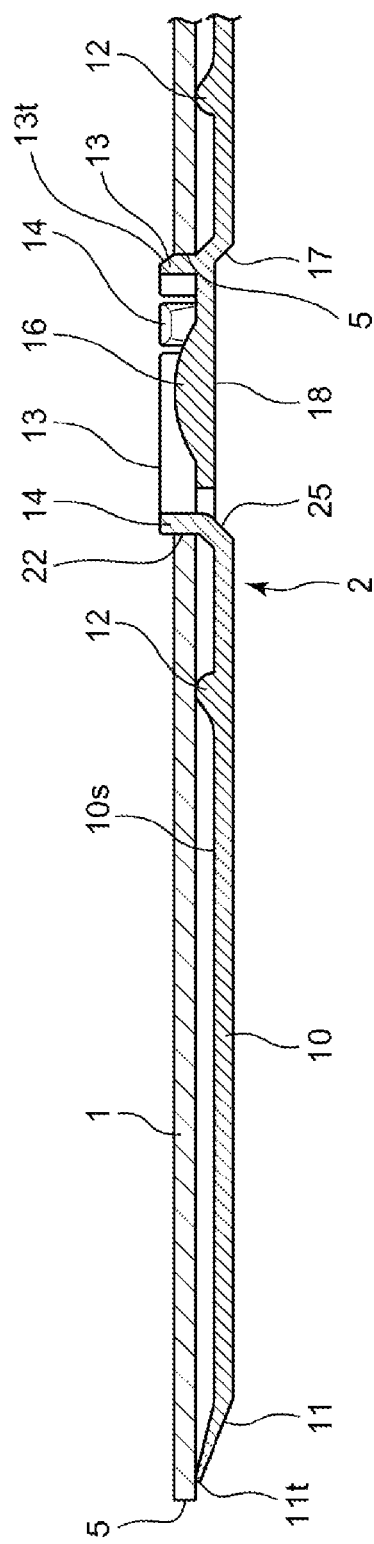
FIG. 5 is a partial cross-sectional view showing the embodiment of the protective cover for disk-shaped recording medium according to the invention and illustrating the protective cover together with the disk-shaped recording medium.
Figure 6:
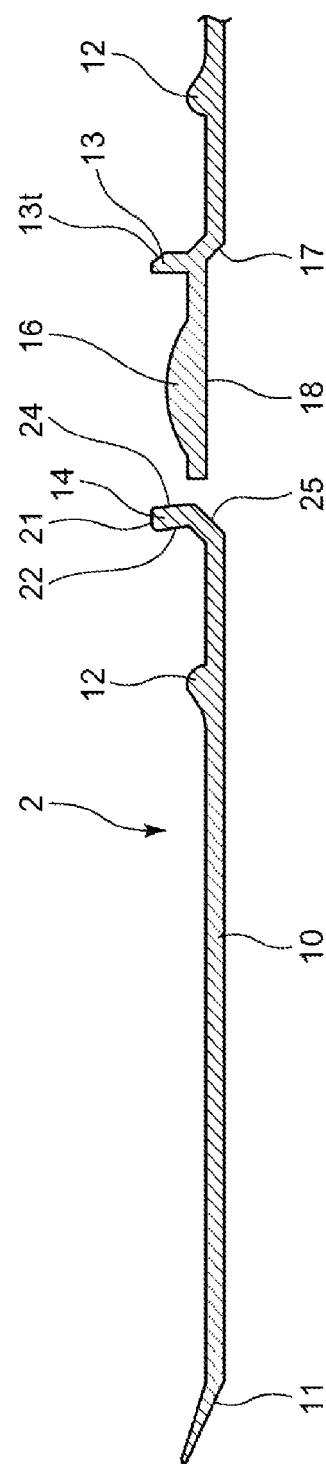
FIG. 6 is a partial cross-sectional view showing the embodiment of the protective cover for disk-shaped recording medium according to the invention and illustrating the cross section itself depicted with hatching areas.

The cover body 10 of the protective cover 2 is a portion formed in a disk shape and is formed with a thickness of approximately 1 millimeter. The outer circumference portion 11 of the protective cover 2 has a shape in which its thickness becomes thinner as going radially outside upon rising from the cover body 10. When the protective cover 2 is attached to disk 1, the edge 11t of the outer circumference portion 11 is to be pushed toward the side of the disk 1 by resilient force from elastic transformation of the protective cover 2. That is, as shown in FIGS. 5, 6, the outer circumference portion 11 has a tapered shape and is formed in obliquely rising from the surface 10s of the cover body 10 when seen cross-sectionally, and the outer circumference portion 11 ensures a space between the surface of the cover body 10 and the disk 1 because the portion rises about 1.3 millimeters when the disk 1 is not attached, thereby protecting the recording area of the recording surface of the disk 1. Because the outer circumference portion 11 is in the tapered shape, the protective cover 2 comes closely contacting with the recording surface of the disk 1 by the resilient force from flexible bending behavior of the slim edge when the disk 1 is attached. The portion at which the edge 11t of the outer circumference portion 11 is contacting is an outer circumferential margin portion having a width of 2 millimeters in a radial direction from the outmost circumferential portion of the disk 1, and there is no adverse effect on signal recorded regions even though the edge 11*t* of the outer circumference portion 11 is contacting the outer circumferential margin portion, so that the signals can surely be read out.

With the protective cover 2, the inner circumferential contacting portion 12 is formed at the inner circumferential margin portion located in opposition to the outer circumference portion 11 astride the recording area on the recording surface of the disk 1. The inner circumferential contacting portion 12 is an annularly projecting portion bending in a cross-sectionally hemisphere shape rising from the surface 10*s* of the cover body 10, and more specifically has a gentle slope on an outer circumferential side of the inner circumferential contacting portion 12 and has an arc-like slope on an inner circumferential side of the inner circumferential contacting portion 12. The height of the inner circumferential contacting portion 12 projecting from the surface 10*s* of the cover body 10 is about 1 millimeter, and the height is nearly the same as the height of the edge 11*t* of the outer circumference portion 11 bending upon contacting the disk 1 when the disk 1 is attached. The slope of the inner circumferential contacting portion 12 is formed in a gentle shape on the outer circumferential side, and therefore, the edge 11*t* of the outer circumference portion 11, the cover body 10, and the inner circumferential contacting portion 12 are arranged in an arc shape around the recording area of the disk 1 when seen cross-sectionally, so that the resilient force against elastic transformation of this area can be enhanced.

The annular projecting portion 13 is a member being formed upright in a cylindrical shape from the surface 10*s* of the cover body 10 and fitting to an inner wall of the hole 4 of the disk 1 when the disk 1 is attached. Cutoff portions 19 are formed at three positions on a circumferential direction, and clips 14 are made at the cutoff portions 19. The centers of the disk 1 and the cover body 2 can be met upon matching the hole 4 of the disk 1 to this annular projecting portion 13. With respect to the height of the annular projecting portion 13, inclined portions for about 1 millimeter rising from the surface 10*s* of the cover body 10 are formed in a bevel shape, and the annular projecting portion 13 is formed in vertically extending for about 2 millimeters from the inclined portion. The convex portion 16 is formed at the center of the annular projecting portion 13, and when the attached disk 1 is detached from the protective cover 2, the protective cover 2 can easily detached from the disk 1 upon pushing the convex portion 16 with the index finger while the disk's outer circumference is held with other fingers, such as e.g., the thumb, the ring finger, and the little finger. A tapered portion 13*t* is formed so as to be high on an inner side and low on an outer side at a top end of the annular projecting portion 13, thereby positioning the center of the disk 1 when the disks 1 respectively attached to the protective cover 2 are stacked, by cooperation with a tapered portion 17 of the concave portion 18 as described below.

Figure 7:
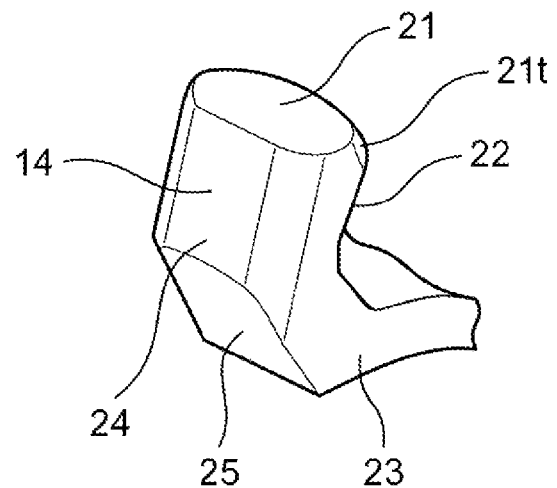
FIG. 7 is a perspective view showing a clip portion of the embodiment of the protective cover for disk-shaped recording medium according to the invention.
Figure 8:
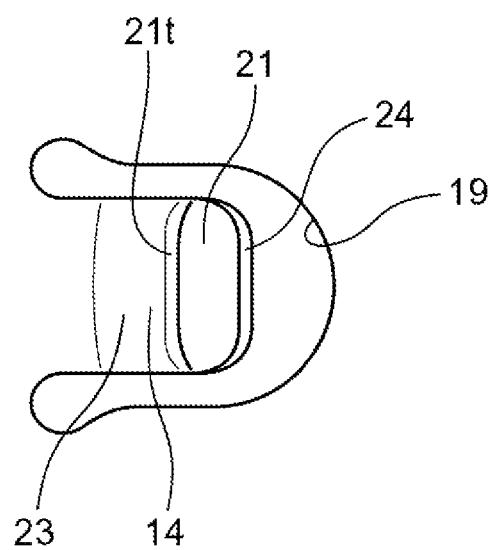
FIG. 8 is a top view showing the clip portion of the embodiment of the protective cover for disk-shaped recording medium according to the invention.

The cutoff portions 19 penetrating the cover body 10 are formed at three positions on the circumference of the annular projecting portion 13, and the clip 14 is arranged at the center of the cutoff portion 19. The clip 14 contacts the inner wall of the hole 4 of the disk 1 and has a structure to engage with the disk upon elastic transformation of a tip side of the clip 4 where the disk 1 is attached to the protective cover 2, and therefore, resilient force from the elastic transformation of the clip 14 renders an engaging portion 22 of the clip 14 pushed toward the inner wall of the hole 4 of the disk 1, thereby securely attaching the disk 1 to the protective cover 2. FIGS. 7, 8 are illustrations showing the clip 14 in an enlarged manner. The clip 14 has a shape having a base portion 23 horizontally extending from the cover body 10 and bending in a letter-L shape, and the tapered portion 21*t* is arranged at the top end 21 of the clip 14 for easily guiding the disk 1. The engaging portion 22 is formed in a shape overhanging above the base portion 23 of the clip 14. The engaging portion 22 secures the disk 1 by being pushed at three positions in total to the inner wall of the hole 4 of the disk 1 when the disk 1 is securely attached to the protective cover 2. An inner wall portion 24 are arranged in opposition to the engaging portion 22 as to be provided almost on the same circumference as the inner surface of the annular projecting portion 13 except the cutoff portions 19. A tapered portion 25 is arranged below the inner wall portion 24 at the position common to the tapered portion 17 of the concave portion 18 as described below.

To attach the disk 1 to the clips 14 having the shape thus described, the disk 1 is pushed down along the axis direction of the annular projecting portion 13. Force is then transmitted from the inner wall of the hole 4 of the disk 1 as to push radially inward the engaging portion 22 of the clip 14 shaped in the slightly overhanging shape, and the entire clip 14 is elastically transformed inward with this force. With this elastic transformation, the engaging portion 22 keeps pushing the inner wall of the hole 4 of the disk 1, thereby securely attaching the disk 1 to the protective cover 2 with friction at the outer circumference of the annular projecting portion 13. When the disk 1 is detached, the disk 1 may be moved as to be taken off along the annular projecting portion 13 in opposition to the pushing force from the engaging portion 22, and more readily, the protective cover 2 can be detached from the disk 1 by pushing the convex portion 16 with the index finger as described above while held with other fingers, such as e.g., the thumb, the ring finger, and the little finger.

Figure 9:
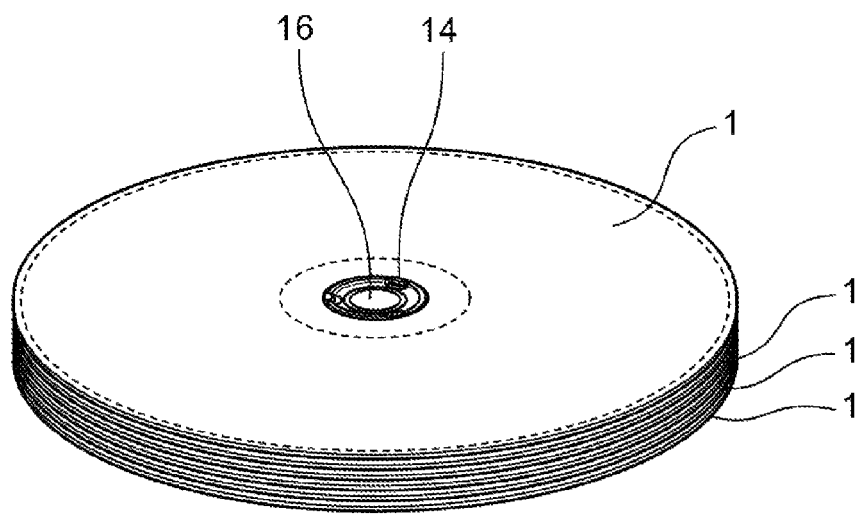
FIG. 9 is a perspective view showing a state in which the protective covers for disk-shaped recording medium according to the embodiment of the invention are stacked.

The concave portion 18 is formed for containing an end of the annular projecting portion 13 of another protective cover when the protective cover is stacked. That is, where the disk 1 is attached to the protective cover 2, the top end of the annular projecting portion 13 is projected from the top surface of the disk 1 by 0.5 to 1.0 millimeter, and the concave portion 18 is so formed as to contain the projecting portion, thereby rendering the disks stacked upon protected with the protective covers as to contain the top end of the annular projecting portion 13 in the concave portion 18. FIG. 9 is a perspective view showing a situation stacking sets in which the disk 1 is attached to the protective cover 2. Where the disks 1 respectively protected with the protective covers 2 are stacked in a plural number so that the concave portion 18 contains the top end of the annular projecting portion 13, the top end having the tapered portion 13*t* of the annular projecting portion 13 is guided with the tapered portion 17 arranged at a circumferential end of the concave portion 18, and therefore, the disks 1 are comparatively readily stacked as positioned as to render the center axis thereof placed coaxially. The intervals among plural disks 1 are no more than the thickness of the cover body 10, so that a large volume is not necessary even though the disks 1 are stacked, thereby realizing significantly reduced space in comparison with a prior art casing requiring an openable lid. The back side of the protective cover 2 is utilized by itself for sales promotion items upon providing prescribed printing, adhering stickers, or providing embossed letters and marks.

With the protective cover 2 according to the embodiment thus structured, first, the disk 1 can be held with one hand 8 as shown in FIG. 2 where a user grips the disk 1 attached to the protective cover 2 and, more particularly, the disk 1 attached to the protective cover 2 can be easily gripped with the thumb 81, other fingers such as the ring finger 82 and the little finger 83. Any portion of the protective cover 2 does not come out of the outer circumference of the disk 1 at this stage, thereby rendering handling of the disk 1 easy.

In addition, in a case where the protective cover 2 is detached from the disk 1, the disk 1 can be detached from the protective cover 2 upon manipulating with one hand. That is, the outer circumference portion of the disk 1 is held with the thumb 81, and other fingers such as the ring finger 82 and the little finger 83, from the side opposite to the side shown in FIG. 2, and the convex portion 16 located at the center of the protective cover 2 is pushed by the remaining middle or index finger. Then, the disk 1 is relatively lifted up from the protective cover 2 along the axis direction of the annular projecting portion 13, and the disk 1 and the protective cover 2 are separated from each other by disengaging the disk 1 from the protective cover 2 in opposing pushing force of the engaging portion 22 of the clip 14 described above. Such separation operation between the disk 1 and the protective cover 2, in accordance with this invention, can be manipulated with a single hand, and it turns out that the protective cover 2 can be readily handled.

As shown in FIG. 9, where the disks 1 protected by the protective cover 2 are stacked in a plural number so that the concave portion 18 contains the top end of the annular projecting portion 13, the top end having the tapered portion 13t of the annular projecting portion 13 is guided by the tapered portion 17 formed at the circumferential end of the concave portion 18, and is positioned so that the central axis becomes coaxial, so that the disks 1 can be relatively easily stacked. The intervals among the disks 1 are no more than the thickness of the cover body 10, and therefore, the protective covers 2 do not require a large volume even though stacked, thereby realizing significantly reduced space in comparison with the prior art casing having the openable lid.

Second Embodiment

Figure 10:
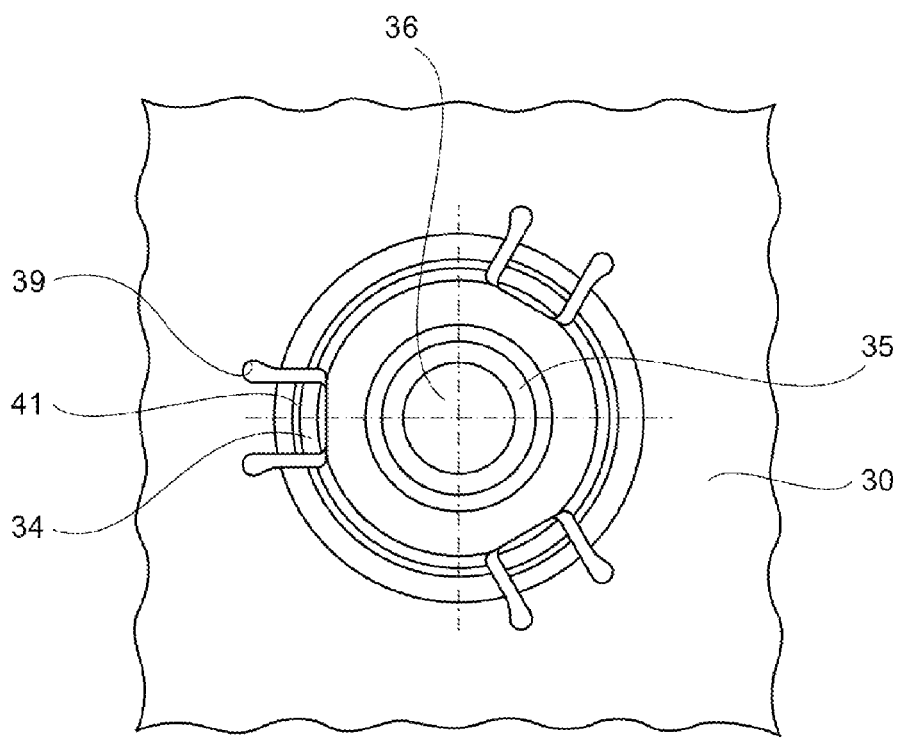
FIG. 10 is a plan view showing essential portions of another embodiment of the protective cover for disk-shaped recording medium according to the invention.
Figure 11:
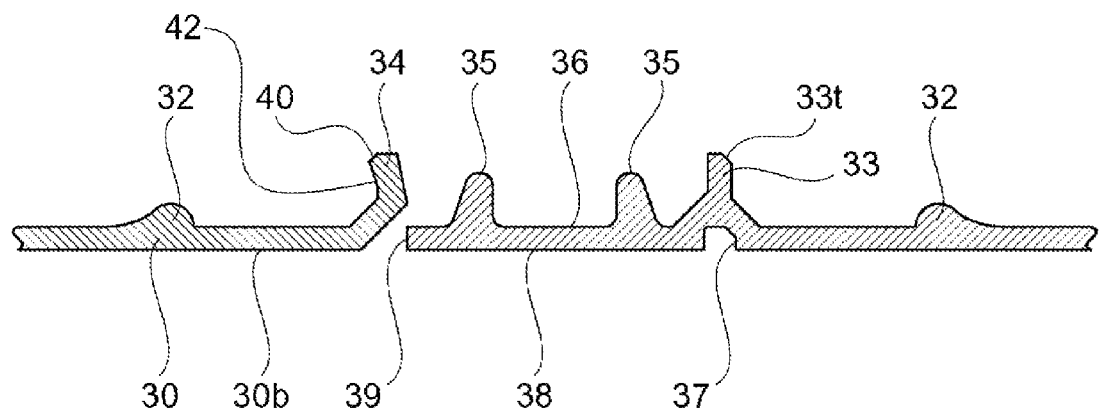
FIG. 11 is a cross-sectional view showing the essential portions of another embodiment of the protective cover for disk-shaped recording medium according to the invention.

The protective cover for disk-shaped recording medium according to the invention is a modification of the protective cover of the above embodiment, and includes a disk-shaped cover body 30 formed in substantially the same way as that of the first embodiment, an outer circumference portion not shown, and an inner circumference portion 32, and further includes as shown in FIGS. 10, 11, an annular projecting portion 33, clips 34 shaped differently from that of the first embodiment, and a center concave portion 36. To avoid a duplicated description, description herein is made mainly for differently shaped portions. The center concave portion 36 is a region surrounded with an annular protecting portion 35 annularly extending. The center concave portion 36 as well as the annular projecting portion 35 formed at the vicinity of the concave portion 36 are arranged as to face a position formed with a though hole formed at a center of a medium where a disk-shaped recording medium is attached to the protective cover. Furthermore, where the protective covers of the disk-shaped recording medium are stacked as attached to the disk-shaped recording medium, the protective covers are stacked and held upon contacting a bottom surface portion 38 serving as the back side of the center concave portion 36 with a top of the annular projecting portion 35 of another protective cover stacked below the protective cover.

An groove portion 37 extending in a ring shape is formed around the bottom surface portion 38, as recessed upward from the surface of the bottom surface portion 38. Where the protective covers for disk-shaped recording medium are stacked as attaching the disk-shaped recording medium, the top of the annular projecting portion 22 enters into the groove portion 37, thereby rendering the protective covers positioned as to be overlapping exactly to one another. Particularly, because the tapered portion 33t formed high on the inner side and low on the outer side is arranged at the top end of the annular projecting portion 33, where the disks attached to the protective covers are stacked, the centers are surely guided in cooperation between the groove portion 37 and the tapered portion 33t.

The annular projecting portion 33 is formed with cutoff portions 39 penetrating the cover body at portions separated with equal intervals at three portions on a circumference in substantially the same way as in the first embodiment, and a clip 34 is formed at a center of the cutoff portion 39. The clip 34 contacts the inner wall of the through hole of the disk and has a structure making an engagement upon elastically transforming the tip side of the clip 34 where the disk is attached to the protective cover; the disk can therefore be secured to the protective cover by pushing an engaging portion 42 of the clip 34 toward the inner wall of the through hole of the disk by means of resilient force from the elastic transformation of the clip 34. The clip 34 has a shape bending in a substantially letter-L shape from a base portion extending horizontally from the cover body, and has a tapered portion 40 arranged at a top end of the clip 34 for making easier guides of the disk. The engaging portion 42 secures the disk by being pushed from elastic transformation at three places as a whole to the inner wall of the through hole of the disk when the disk is attached to the protective cover.

With the protective cover according to the embodiment, in substantially the same way as the above embodiment, where the user grips the disk with user's hand in a state that the disk is attached to the protective cover, the user can grip the disk with the single hand, and at this stage, the protective cover 2 does not come out of the outer circumference of the disk and renders its handling easy. When the protective cover is detached from the disk, the disk can be detached easily by manipulating the cover with the single hand.

Where the disks protected with the protective cover are stacked in a plural number, the top end having the tapered portion 33t of the annular projecting portion 33 is guided with the tapered portion 37t of the circumferential end of the groove portion 37, thereby positioning the center axes to be coaxial, and thereby rendering the disks stacked relatively easily. The intervals among the plural disks are no more than the thickness of the cover body in substantially the same way as the above embodiment, so that a large volume is not required even where the disks are stacked, thereby realizing significantly reduced space in comparison with the casing needing the conventional openable lid. A portion of the center concave portion 36 has its bottom surface portion 38, and has the same surface as the bottom surface portion 30b of the cover body 30, so that molds for injection molding are easy to be made, and so that this cover allows production managements in size accuracy and ability on reproduction to be excellent because of having less undulations in comparison with the above embodiment.

Third Embodiment

Figure 12:
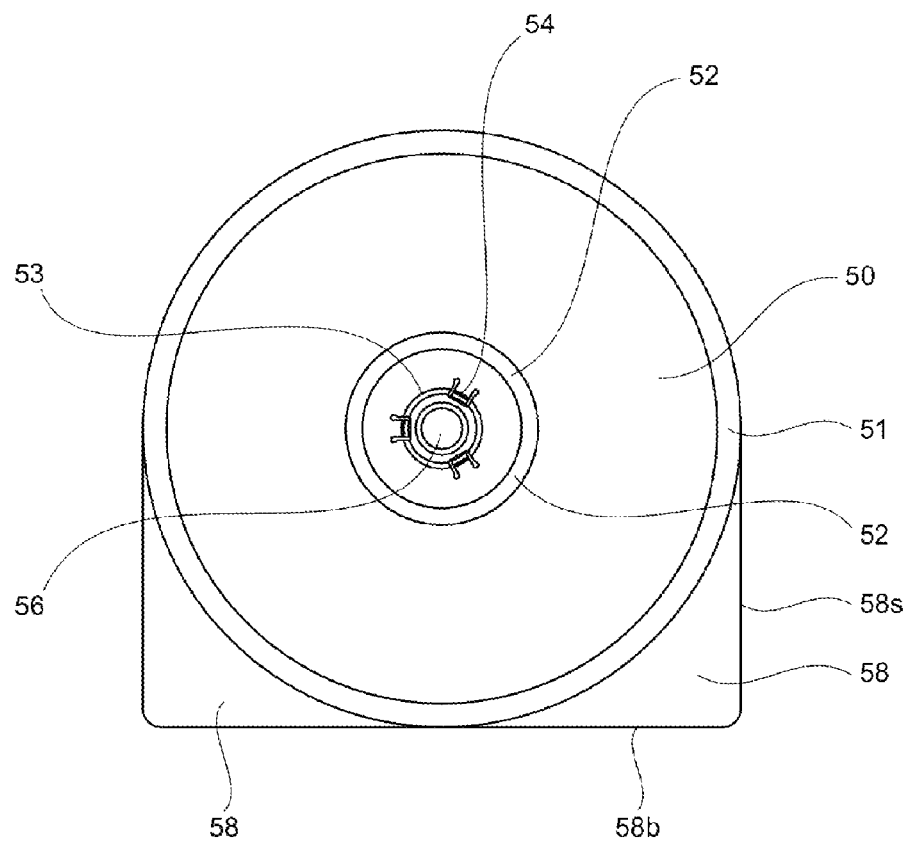
FIG. 12 is a plan view showing yet another embodiment of the protective cover for disk-shaped recording medium according to the invention.

As shown in FIG. 12, the protective cover 50 according to this embodiment is an example that is formed with an extension portion 58 at a part of an outer circumference portion 51. The cover 50 includes a center concave portion 56, an annular projecting portion 53 extending in a ring shape around the portion 56, and clips 54 transformed from parts of the annular projecting portion 53 to hold the disk through the inner wall of the through hole of the disk. The clips 54 are arranged at three places on the ring of the annular projecting portion 53 at portions separated with the same interval. In this embodiment, a pair of the extension portions 58 is arranged at parts of the outer circumference portion 51. The extension portion 58 is formed in substantially a triangle shape having the same thickness as the thin protective cover 50 in a projecting manner from a region attaching the disk. The pair of the extension portions 58 has ends made of edges 58b, 58s, respectively, and the edges 58b of the pair of the extension portions 58 are commonly in a straight line shape and are formed at a position to be a tangent with respect to the outer circumference portion 51. Where the disks in a plural number are stacked, the extension portions 58 of the respective protective covers are stacked in the plural number and held, and the edges 58b by themselves constitute a bottom structured with plural straight lines arranged in parallel with tiny spaces. The stacked protective covers can be supported by rendering the face made of the plural edges 58b served as the bottom, thereby being able to support the stacked protective covers otherwise rotated due to a cylindrical shape if without the extension portions 58, in preventing the covers from revolving. The extension portion 58 can be functioned as an index for protective cover stacked with the disk, and can be functioned as a region for showing such as e.g., title, artist name, and date, or a region to be adhered with stickers. The extension portion 58 is in substantially the triangle shape in this embodiment, it can be other shapes, and the extension portion can be other shapes as far as functioning as a stand when stacked in a plural number as well as functioning as an index. A single extension portion can be arranged as other shaped extension portion.

In the first embodiment, the description is made in exemplifying, with sizes, the protective cover for mainly 120 millimeters disk-shaped recording medium, but the protective cover of the invention is advantageous even for disk-shaped recording medium having other sizes, and substantially the same advantages can be obtained by adapting the size thereof. Although in the above embodiments the clips are described as arranged at the three places as the means for securing the disk, other structures can be used as securing means for securing the disk to the protective cover. In this embodiment, the protective cover is described as having the disk shape recording medium attached on a single side, but the invention can realize protective covers for disk shape recording medium having a structure holding the disks on double sides of the protective cover by adhering the back sides of the protective covers with each other or rendering the cover body in common.

What is claimed is:

1. A protective cover made of a resin for covering a recording surface of a disk-shaped recording medium and for protecting the recording surface of the disk-shaped recording medium, characterized in having:
   a diameter of the protective cover smaller than a diameter of the disk-shaped recording medium; and
   an outer circumference portion of the protective cover in contact with a margin portion located on an inner circumferential side of the recording area on a recording surface of the disk-shaped recording medium,
   wherein a cover body of the protective cover is arranged as kept away from the recording surface of the disk-shaped recording medium between the outer circumference portion and an inner circumference contacting portion in contact with a margin portion on an inner circumferential side of the recording area on the recording surface of the disk-shaped recording medium.

2. The protective cover for disk-shaped recording medium according to claim 1, further having an annular projecting portion fitting to a center hole of the disk-shaped recording medium and having a convex portion at a center of the annular projecting portion.

3. The protective cover for disk-shaped recording medium according to claim 2, further having a concave portion arranged at a region on a back side of the protective cover corresponding to the annular projecting portion for containing an end of the annular projecting portion of another protective cover where another protective cover is stacked.

4. The protective cover for disk-shaped recording medium according to claim 3, further having an inclined surface arranged at the concave portion for preventing the cover from shifting laterally when stacked.

5. The protective cover for disk-shaped recording medium according to claim 2, wherein the annular projecting portion includes as a part a cutoff portion, and a clip is arranged at the cutoff portion for engaging an end of the center hole as to push radially outward the center hole of the disk-shaped recording medium.

6. The protective cover for disk-shaped recording medium according to claim 1, wherein the outer circumference portion is formed in a shape rising upright and having a thinner thickness as going radially more outward, and wherein an end of the outer circumference portion is pushed toward the disk-shaped recording medium by resilient force from the elastic transformation of the protective cover when the protective cover is attached to the disk-shaped recording medium.

7. The protective cover for disk-shaped recording medium according to claim 1, further having an annular protecting portion fitting to a center hole of the disk-shaped recording medium, wherein a back side on a side inner than the annular projecting portion has the same level to a back side of a region between the outer circumference portion of the protective cover and the inner circumference contacting portion.

8. The protective cover for disk-shaped recording medium according to claim 1, further having an extension portion extended outward from the outer circumference portion.

\* \* \* \* \*